(12) United States Patent
Torgard

(10) Patent No.: US 9,879,541 B2
(45) Date of Patent: Jan. 30, 2018

(54) ROTOR BLADE WITH A SEGMENTED SUPPORTING STRUCTURE AND METHOD FOR MANUFACTURING THE ROTOR BLADE

(71) Applicant: Sigmund Wenningsted Torgard, Aalborg (DK)

(72) Inventor: Sigmund Wenningsted Torgard, Aalborg (DK)

(73) Assignee: Siemens Aktiengesellschaft, Munich (DE)

( * ) Notice: Subject to any disclaimer, the term of this patent is extended or adjusted under 35 U.S.C. 154(b) by 765 days.

(21) Appl. No.: 14/201,885

(22) Filed: Mar. 9, 2014

(65) Prior Publication Data
US 2015/0010406 A1  Jan. 8, 2015

(30) Foreign Application Priority Data
Mar. 20, 2013 (EP) ..................................... 13160215

(51) Int. Cl.
*F04D 29/38* (2006.01)
*F01D 5/14* (2006.01)
(Continued)

(52) U.S. Cl.
CPC .............. *F01D 5/147* (2013.01); *B23P 15/04* (2013.01); *B29C 70/48* (2013.01); *F03D 1/0675* (2013.01);
(Continued)

(58) Field of Classification Search
CPC . B29C 66/7212; B64C 27/473; F03D 1/0675; F03D 1/0683; Y10T 29/49337; F01D 5/147
(Continued)

(56) References Cited

U.S. PATENT DOCUMENTS 3,603,701 A * 9/1971 Tarcrynski ............... B64C 27/48
416/204 R
7,165,945 B2 * 1/2007 Kovalsky ............... B29C 70/222
416/226
(Continued)

FOREIGN PATENT DOCUMENTS

EP  2511477 A1  10/2012
GB  2463250 A   3/2010
(Continued)

*Primary Examiner* — Reinaldo Sanchez-Medina
(74) *Attorney, Agent, or Firm* — Beusse Wolter Sanks & Maire

(57) ABSTRACT

A rotor blade with a supporting structure, wherein the rotor blade has a rotor blade base section and a rotor blade tip section, is provided. The supporting structure includes a first supporting segment for supporting the rotor blade base section and at least a second supporting segment for supporting the rotor blade tip section. Furthermore, the supporting structure includes the first supporting segment and the second supporting segment along the rotor blade longitudinal direction. The first supporting segment is joined to the second supporting segment in a supporting structure transition section, wherein the supporting structure transition section is located in between the rotor blade base section and the rotor blade tip section. Finally, the first supporting segment and/or the second supporting segment include a fiber material. A method for manufacturing the rotor blade is also provided.

19 Claims, 3 Drawing Sheets

(51) Int. Cl.
  *F03D 1/06* (2006.01)
  *B29C 70/48* (2006.01)
  *B23P 15/04* (2006.01)
  *B29L 31/08* (2006.01)

(52) U.S. Cl.
  CPC ........ *F03D 1/0683* (2013.01); *B29L 2031/08* (2013.01); *F05B 2280/6003* (2013.01); *F05B 2280/6013* (2013.01); *Y02E 10/721* (2013.01); *Y02P 70/523* (2015.11); *Y10T 29/49336* (2015.01)

(58) Field of Classification Search
  USPC .......................................... 416/226; 29/889.7
  See application file for complete search history.

(56) References Cited

U.S. PATENT DOCUMENTS

| | | | | |
|---|---|---|---|---|
| 7,758,312 | B2* | 7/2010 | Leahy | B64C 27/463 416/224 |
| 7,976,282 | B2* | 7/2011 | Livingston | F03D 1/0675 29/889.7 |
| 8,777,578 | B2* | 7/2014 | Hancock | B25B 11/02 416/226 |
| 8,870,546 | B2* | 10/2014 | Westergaard | F03D 1/0675 416/223 R |
| 9,011,103 | B2* | 4/2015 | Kontis | B29C 65/48 416/226 |
| 2006/0104812 | A1* | 5/2006 | Kovalsky | B64C 27/463 416/87 |
| 2007/0025859 | A1 | 2/2007 | Jacobsen | |
| 2009/0068017 | A1* | 3/2009 | Rudling | F03D 1/0675 416/219 R |
| 2010/0260611 | A1* | 10/2010 | Rudling | F03D 1/0675 416/226 |
| 2011/0158788 | A1* | 6/2011 | Bech | F03D 1/0675 415/1 |
| 2011/0211968 | A1* | 9/2011 | Simkulak | B64C 27/463 416/226 |
| 2011/0293433 | A1* | 12/2011 | Westergaard | F03D 1/0675 416/226 |
| 2012/0107129 | A1* | 5/2012 | Kulenkampff | B29C 65/52 416/226 |
| 2014/0271217 | A1* | 9/2014 | Baker | F03D 1/0633 416/226 |

FOREIGN PATENT DOCUMENTS

| | | |
|---|---|---|
| GB | 2477847 A | 8/2011 |
| WO | 2006002621 A1 | 1/2006 |
| WO | 2006056584 A1 | 6/2006 |
| WO | 2009153341 A2 | 12/2009 |
| WO | 2010065928 A1 | 6/2010 |

* cited by examiner

ROTOR BLADE WITH A SEGMENTED SUPPORTING STRUCTURE AND METHOD FOR MANUFACTURING THE ROTOR BLADE

CROSS REFERENCE TO RELATED APPLICATIONS

This application claims the benefit of European Application No. EP13160215 filed Mar. 20, 2013, incorporated by reference herein in its entirety.

FIELD OF INVENTION

The present invention relates to a rotor blade with a supporting structure. Furthermore, the invention relates to a method of manufacturing the rotor blade.

BACKGROUND OF THE INVENTION

A rotor blade, for instance, comprises an envelope, a supporting structure and a filling material. The envelope represents an outer shell (or shroud) of the rotor blade. In other words, the envelope represents a surface of the rotor blade. The supporting structure supports a weight of the rotor blade and gives stability to the rotor blade against loads or forces exerted to the rotor blade. The envelope defines an interior of the rotor blade. The interior comprises the supporting structure and e.g. comprises the filling material.

A rotor may generally be defined as a rotating part of a mechanical device. A rotor blade, which is a part of the rotor, is for example used in a turbine engine, such as a wind turbine engine, a gas turbine engine or a water turbine engine.

The rotor blade may have a straight shape with regard to a longitudinal direction of the rotor blade. The rotor blade may also have a curved (or swept) shape.

A curved rotor blade, i.e. a rotor blade with a curved shape, for a wind turbine engine is for example known from the patent application US 20070025859 A1. One problem of prior art curved rotor blades with regard to the supporting structure is that the supporting structure follows a curvature of the curved rotor blade. If, for example, the supporting structure comprises fibre material, a problem of a curved supporting structure made of fibre material is that the fibre material may create wrinkles or bunches. This may weaken the supporting structure and as a consequence a risk of breakdown of the rotor blade exists.

SUMMARY OF THE INVENTION

Thus there exists an urgent need to provide an improved supporting structure of a rotor blade, the improved supporting structure being well suited for a curved, i.e. swept, shape of the rotor blade.

This objective is achieved by the independent claims. The dependent claims describe advantageous developments and modifications of the invention.

In accordance with aspects of the invention there is provided a rotor blade with a supporting structure, wherein the rotor blade comprises a rotor blade base section and a rotor blade tip section. Furthermore, the rotor blade comprises a rotor blade longitudinal direction, wherein the rotor blade longitudinal direction extends from the rotor blade base section to the rotor blade tip section. Moreover, the supporting structure comprises a first supporting segment for supporting the rotor blade base section and at least a second supporting segment for supporting the rotor blade tip section. The supporting structure comprises the first supporting segment and the second supporting segment along the longitudinal direction. Additionally, the first supporting segment is joined to the second supporting segment in a supporting structure transition section, wherein the supporting structure transition section is located in between the rotor blade base section and the rotor blade tip section. Finally, the first supporting segment and/or the second supporting segment comprises a fibre material.

An important feature of the rotor blade according to the invention is that the rotor blade comprises a supporting structure which is segmented. A segmented supporting structure offers a plurality of new possibilities and advantages with regard to construction of a rotor blade, compared to the state of the art. One advantage of a segmented supporting structure is for example that the construction of curved rotor blades is improved. In more detail, a segmented supporting structure enables a provision of an angled supporting structure comprising for example a first straight supporting segment and a second straight supporting segment, arranged one after the other in an angle. Another advantage of a segmented supporting structure is that the construction of a large, i.e. long, rotor blade may be facilitated. More specifically, the construction is facilitated because a long total supporting structure can be assembled by several individual supporting segments, which are each shorter than the long total supporting structure and thus easier to construct and handle.

The rotor blade comprises a rotor blade base section and a rotor blade tip section. The rotor blade base section may comprise a flange in order to connect or attach the rotor blade for example to a hub of a wind turbine. The flange may comprise a single row of holes or a double row of holes. Furthermore, the rotor blade base section may comprise steel. The rotor blade base section may comprise up to 10% of a total volume of the rotor blade.

The rotor blade tip section comprises a section around a tip of the rotor blade. The rotor blade tip section may also comprise up to 10% of the total volume of the rotor blade.

The rotor blade longitudinal direction is a longitudinal direction of the rotor blade. In other words, the rotor blade longitudinal direction extends in the longitudinal direction of the rotor blade.

If, for example, the rotor blade is mirror symmetrical to an axis of symmetry, then the rotor blade longitudinal direction is equivalent to the axis of symmetry. In other words, the rotor blade longitudinal direction lies on a fictitious line extending from the rotor blade base section to the rotor blade tip section.

The supporting structure comprises a first supporting segment and a second supporting segment. It may be beneficial that the supporting structure comprises one or more further supporting segments. The first supporting segment may directly adjoin the rotor blade base section and/or the second supporting segment may directly adjoin the rotor blade tip section.

The first supporting segment and the second supporting segment are arranged one after the other (or in a row) along the rotor blade longitudinal direction. If, in a first example, the rotor blade comprises a straight shape, i.e. the first supporting segment and the second supporting segment form an angle of approximately 180 degrees, then the first supporting segment and the second supporting segment may follow the rotor blade longitudinal direction. If, in a second example, the rotor blade comprises a curved shape, i.e. the first supporting segment and the second supporting segment form an angle which is smaller than 180 degrees, then a longitudinal direction of the first supporting segment and/or the second supporting segment may deviate from an exact direction of the rotor blade longitudinal direction. Thus, the expression that the supporting structure comprises several segments along the rotor blade longitudinal direction has to be understood such that the supporting structure is divided into supporting segments extending substantially along the rotor blade longitudinal direction. This may comprise deviations up to 20 degrees, in particular up to 10 degrees.

The first supporting segment and the second supporting segment are joined (or attached or connected) to each other in the supporting structure transition section. The supporting structure transition section may comprise up to 20%, in particular up to 10%, of the total volume of the rotor blade.

The first supporting segment and/or the second supporting segment comprises a fibre material. A fibre material is advantageous and well suited for a supporting structure of a rotor blade. A fibre material may be flexible and easy to handle during manufacturing while being robust and stiff after for example a curing step.

The supporting structure of a rotor blade is also denoted a spar. A spar is also referred to as a main structural component of the rotor blade.

The supporting structure may provide a majority of weight support and dynamic load.

In a first embodiment the first supporting segment comprises at least a first layer of fibre material and the second supporting segment comprises at least a second layer of fibre material.

A layer is a three dimensional object comprising a length, a width and a thickness. The layer may be thin, which means that the length is at least ten times greater than the thickness. In addition, the width is also at least ten times greater than the thickness.

In another embodiment the fibre material comprises a fabric with fibres, in particular a fabric with unidirectional fibres.

The fibre material may comprise natural fibre material and/or synthetic fibre material. Examples of fibres with synthetic fibre material are metallic fibres, carbon fibres, silicon carbide fibres, fibre glass, mineral fibres, cellulose fibres, polymer fibres or microfibers. A fibre may comprise a cylindrical shape, in particular a circular cylindrical shape comprising for example a diameter between 15 micrometer and 25 micrometer. A plurality of fibres may be bundled into a thread (or yarn) of fibres. The thread may comprise a diameter between 5 mm (millimeter) and 10 mm.

A fabric comprises a network of natural and/or synthetic fibres. A fabric may comprise a shape of a thin layer. The fabric may comprise a width in a range between 200 mm and 800 mm.

In an advantageous embodiment the fabric comprises unidirectional fibres. A fabric with unidirectional fibres comprises fibres which are substantially parallel to each other. The notion "substantially" in this context includes deviations of up to 10%, in particular of up to 5% with regard to a first direction of a first fibre and a second direction of a second fibre. It is advantageous if more than 50% of the fibres in the fabric are unidirectional. In particular, more than 80% of the fibres are unidirectional.

In another advantageous embodiment the fibre material comprises a composite material, in particular a sheet with pre-impregnated composite material.

A composite material, which is also called a composition material or a composite, is a material which is made from two or more constituent materials with different physical and/or chemical properties. If the constituent materials are combined, a composite material with characteristics, which are different from the properties of the constituent materials, is obtained. A pre-impregnated composite material, which is also called a pre-preg composite material, is a material that comprises a matrix material and a fibre material, wherein the matrix material may already be at least partly cured.

Advantageously, the fibre material comprises a sheet with pre-impregnated composite material. A sheet in the context of this patent application signifies a thin layer. Furthermore, it is beneficial if the sheet with pre-impregnated composite material is flexible, as a flexible sheet may be easier to handle and manufacture.

In a further advantageous embodiment the first layer and/or the second layer comprises a planar shape.

In other words, the first layer and/or the second layer is flat. As a matter of course, any object, e.g. the first layer and the second layer, comprises a certain roughness on a surface. Therefore, the planar shape of the layers means that the layers are substantially flat.

An advantage of a flat layer is on the one hand a facilitated and easy storage of the layers and on the other hand an ease of manufacturing.

In another embodiment the first layer comprises at least a first layer longitudinal surface section and at least a first layer transversal surface section, wherein the first layer longitudinal surface section is greater than the first layer transversal section. Furthermore, the second layer comprises at least a second layer longitudinal surface section and at least a second layer transversal surface section, wherein the second layer longitudinal surface section is greater than the second layer transversal surface section. The first layer transversal section is directly joined to the second layer transversal surface section in the supporting structure transition section.

A surface section can be delimited by edges or rims. This may for example be the case if the first layer and/or the second layer is a cuboid, e.g. a rectangular cuboid. The first layer and/or the second layer may, however, also comprise a blunt or rounded edge or rim.

In the rotor blade transition section two of the surface sections are directly joined with each other. A direct joint means that the two surface sections are brought directly adjacent to each other. This does however not exclude an alternative where an adhesive lies between the first layer first transversal surface section and the second layer first transversal surface section.

In another embodiment the first layer and the second layer at least partly overlay in the supporting structure transition section.

In other words, the first layer and the second layer overlap at least partly.

The notion of two layers overlaying each other signifies that the two layers are directly joined to each other or only separated by an adhesive (or setting) material.

In another advantageous embodiment the first supporting segment comprises a stack of additional layers for additionally supporting the first supporting segment, and the second supporting segment comprises a further stack of further additional layers for additionally supporting the second supporting segment. The first layer and the stack of additional layers at least partly overlay, and the second layer and the further stack of further additional layers at least partly overlay. Furthermore, the stack of additional layers is joined to the further stack of further additional layers in the supporting structure transition section.

The stack of additional layers and the further stack of further additional layers signify a plurality of additional layers stacked to each other and a further plurality of further additional layers stacked to each other, respectively. A stack of additional layers for additionally supporting the first supporting segment may beneficially increase a rigidity, a stiffness or a robustness of the first supporting segment. Analogously, the further stack of further additional layers may beneficially increase the rigidity, the stiffness and the robustness of the second supporting segment.

Advantageously, the stack of additional layers is directly joined to the further stack of further additional layers in the supporting structure transition section. Alternatively or additionally, the stack of additional layers and the further stack of further additional layers at least partly overlay.

As an example, a rotor blade with a longitudinal dimension of 30 m (meter) may comprise a stack of 5 to 10 additional layers. As another example, a rotor blade with a longitudinal dimension of 50 to 55 m may comprise a stack of 40 to 60 additional layers. As yet another example, a rotor blade with a longitudinal dimension of greater than 60 m may comprise a stack of more than 50 additional layers.

Regarding a joint between the additional layers and the further additional layers, several alternatives exist.

In a first alternative a first additional layer and a first further additional layer overlay in the rotor blade transition section. Analogously, a second additional layer and a second further additional layer overlay in the rotor blade transition section. However, an amount of excess material may occur and may be generated in the rotor blade transition section. This may lead to a bulge in the rotor blade.

In a second alternative the additional layers are stepped down, e.g. evenly, in the rotor blade transition section and the further additional layers, which correspond to the additional layers, are stepped up at an identical rate. An advantage of this second alternative is that no excess material within the rotor blade transition section is generated. However, a crack risk in the rotor blade transition section may be high.

A third alternative comprises a first fraction of the additional layers and a first fraction of the further additional layers, which are both grouped together. Within this group the additional layers step down and the further additional layers step up correspondingly. By this, a number of groups can be formed. An advantage of the third alternative is a further reduced risk of cracking in the rotor blade transition section compared to the first and/or second alternative. Another advantage is that the joint between the additional layers and the further additional layers is more compact compared to the second alternative.

Finally, in a fourth alternative the first alternative and the third alternative are combined. Thus there is generated a joint between the additional layers and the further additional layers which comprises an overlap of layers as well as a stepping down and stepping up of layers as well as a grouping of layers. The fourth alternative may even further reduce the crack risk compared to e.g. the third alternative.

If the additional layers are stepped up (or down), a stepping rate may be even, i.e. it may comprise similar step heights and step widths for every step. Alternatively, the step height and step width may vary among the steps.

The thickness among the additional layers and/or the further additional layers may be similar for each of the additional layers and each of the further additional layers, respectively. Alternatively, the thickness may vary among the layers.

In another embodiment the first supporting segment and/or the second supporting element substantially comprises a shape of a cuboid.

A cuboid is meant to be a convex polyhedron bounded by six quadrilateral faces. Examples of a cuboid are a parallelepiped or a square frustum, which is a square pyramid with a truncated apex. In particular the cuboid may be a rectangular cuboid, wherein at least one of the six faces comprises a shape of a rectangle.

The term "substantially" in this context refers to the matter of fact that in reality the first supporting segment and/or the second supporting element may potentially not comprise an ideal shape of a cuboid in a strict geometrical sense. Deviations of the shape of an ideal cuboid shall therefore also be comprised.

In another embodiment a longitudinal direction of the first supporting segment and a longitudinal direction of the second supporting segment form an angle which is smaller than 175 degrees, in particular smaller than 170 degrees.

The longitudinal direction of the first supporting segment and the longitudinal direction of the second supporting segment are defined in analogy to the rotor blade longitudinal direction. In other words, they relate to a longitudinal dimension or longitudinal extension of the first supporting segment and the second supporting segment, respectively.

In particular, for a rotor blade with a curved shape it is highly advantageous that the first supporting segment and the second supporting segment are arranged in an angled way. Particularly, for a strongly curved rotor blade it is advantageous that the angle is smaller than 160 degrees.

An advantage of a segmented, angled supporting structure of a rotor blade is that known and well proven straight supporting segments can be used. However, a curved shape of the whole supporting structure can be realized. A wind turbine rotor blade manufacturer for example, who primarily has focused on producing non-curved rotor blades, is thus not forced to redesign and redevelop new manufacturing technologies in order to produce curved rotor blades.

A rotor blade with a curved shape is also referred to as a rotor blade with a shape of an Arabian sword.

In another embodiment the first supporting segment comprises a supplementary first supporting segment for additionally supporting the rotor blade. Furthermore, the second supporting segment comprises a supplementary second supporting segment for additionally supporting the rotor blade. The first supporting segment is joined to the supplementary first supporting segment by means of a first connection component and/or the second supporting segment is joined to the supplementary second supporting segment by means of a second connection component.

In a rotor blade it may be beneficial to have supplementary supporting structures. The supporting segments and the further supporting segments may beneficially be substantially parallel to each other. Advantageously, the supporting segments and the supplementary supporting segments may be directly connected by the connection components. The connection components may in particular be perpendicular or substantially perpendicular to the supporting segments and/or the supplementary supporting segments.

In an advantageous embodiment the rotor blade is a part of a wind turbine engine.

A wind turbine engine, which may also be referred to as a wind power plant or a wind charger or a wind turbine, converts kinetic energy from wind, also called wind energy, into electrical energy. A wind turbine engine may comprise a tower, a nacelle, a hub, and one or several rotor blades.

The invention is also directed to a method for manufacturing a rotor blade as described above. The method comprises joining the first supporting segment and the second supporting segment.

In other words, the method comprises attaching or connecting the first supporting segment and the second supporting segment.

In particular, the method is suited to manufacture a rotor blade of a wind turbine engine.

In an advantageous embodiment the method comprises arranging the first layer and the second layer in a mould; applying a filling material, in particular a liquid filling material, into the mould and thus obtaining a composite comprised by the supporting structure and the filling material; and curing the composite.

In particular, the filling material is funnelled into the mould.

In order to manufacture the whole rotor blade it is beneficial to provide a further mould. By means of the mould, a first half of the rotor blade could be manufactured; by means of the further mould, a second half of the rotor blade could be manufactured. Furthermore, it may be advantageous to use vacuum technology for funnelling the filling material into the mould. An example of an advantageous liquid filling material is resin, in particular epoxy resin. An example of curing conditions for curing the composite is heating the composite at 60 degree Celsius for five to seven hours.

The aspects defined above and further aspects of the present invention are apparent from the examples of embodiment to be described hereinafter and are explained with reference to the examples of embodiments.

BRIEF DESCRIPTION OF THE DRAWINGS

Embodiments of the invention are now described, by way of example only, with reference to the accompanying drawings.

The drawings are shown schematically.

DETAILED DESCRIPTION OF THE DRAWINGS

Figure 1:
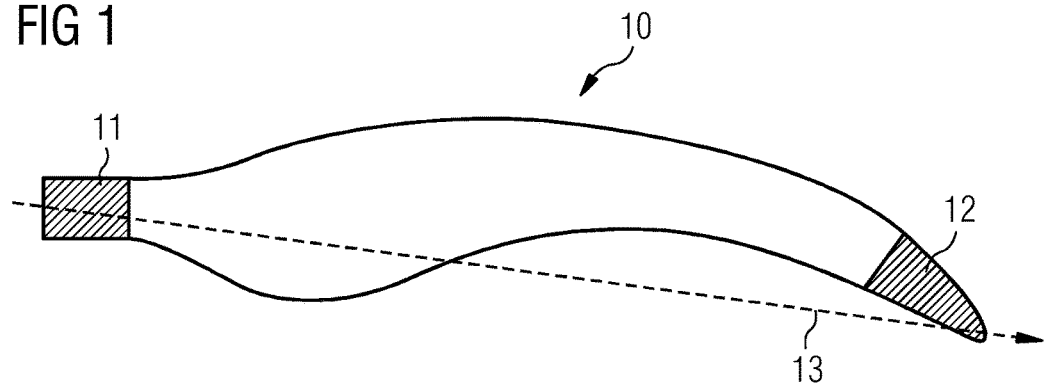
FIG. 1 shows a rotor blade.

Referring to FIG. 1, a rotor blade 10 comprising a curved shape is shown. The rotor blade 10 comprises a rotor blade base section 11 and a rotor blade tip section 12. Additionally, in FIG. 1 a rotor blade longitudinal direction 13 of the rotor blade 10 is depicted. The rotor blade longitudinal direction 13 extends (or intersects or traverses) the rotor blade base section 11 and the rotor blade tip section 12.

Figure 2:
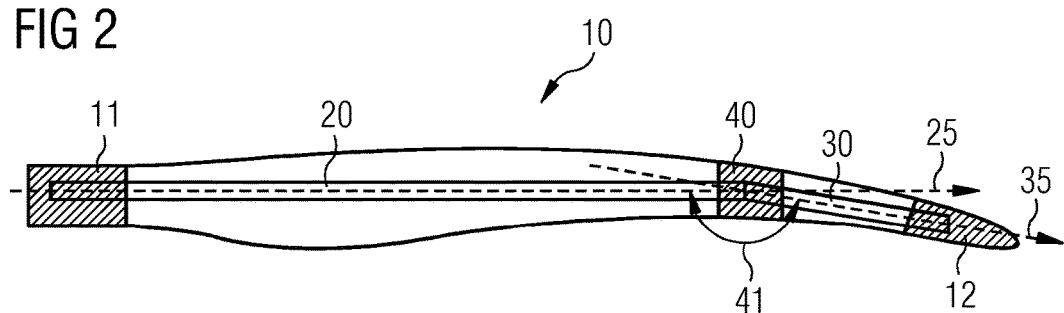
FIG. 2 shows a rotor blade with a supporting structure comprising a first supporting segment and a second supporting segment.

In FIG. 2, a supporting structure comprising a first supporting segment 20 and a second supporting segment 30 of a rotor blade 10 is illustrated. Again, the rotor blade 10 comprises a rotor blade base section 11 and a rotor blade tip section 12. The first supporting segment 20, which comprises a longitudinal direction of the first supporting segment 25, and the second supporting segment 30, which comprises a longitudinal direction of the second supporting segment 35, join each other in a supporting structure transition section 40. As the rotor blade 10 comprises a curved shape, the longitudinal direction of the first supporting segment 25 and the longitudinal direction of the second supporting segment 35 form an angle 41 of approximately 170 degrees. This is of great benefit for the supporting structure of the rotor blade 10.

Figure 3:
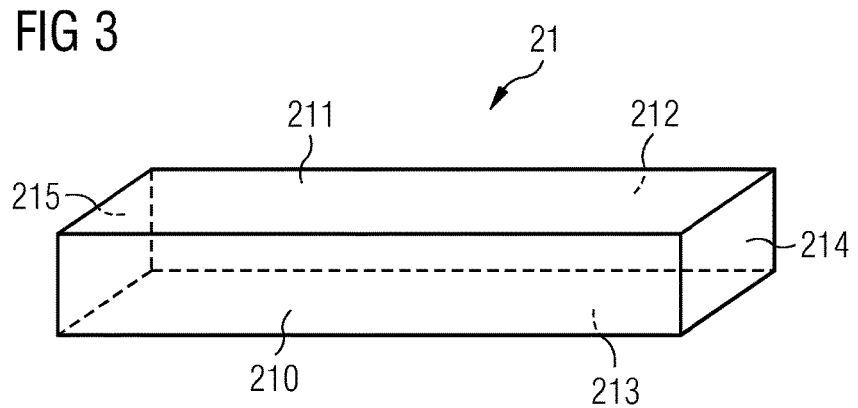
FIG. 3 shows a first layer of a first supporting segment.

FIG. 3 shows a first layer 21 of a first supporting segment 20. The first layer 21 comprises a shape of a rectangular cuboid. The first layer 21 comprises six faces, namely four longitudinal surface sections and two transversal surface sections. Specifically, the first layer 21 comprises a first layer first longitudinal surface section 210, a first layer second longitudinal surface section 211, a first layer third longitudinal surface section 212 and a first layer fourth longitudinal surface section 213. Additionally, it comprises a first layer first transversal surface section 214 and a first layer second transversal surface section 215. It can be seen that each of the two transversal surface sections has an area which is smaller than another area of each of the four longitudinal surface sections. Advantageously, the first layer first transversal surface section 214 is joined with a similar transversal surface section of a second layer 31.

Figure 4:
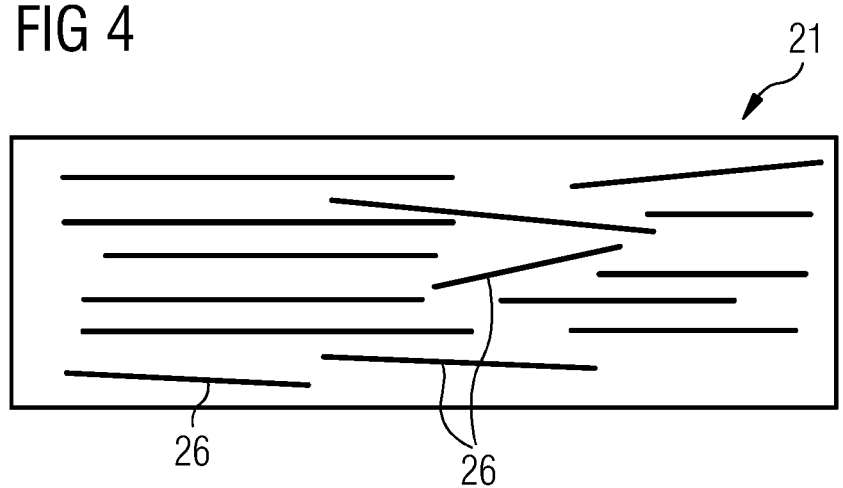
FIG. 4 shows a first layer of a first supporting segment comprising a plurality of unidirectional fibres.

FIG. 4 shows a first layer 21 of a first supporting segment 20 comprising a plurality of unidirectional fibres 26. It can be seen that the unidirectional fibres 26 are substantially parallel to each other.

Figure 5:
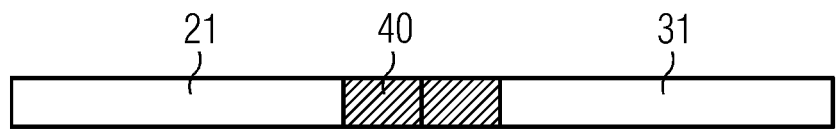
FIG. 5 shows a first layer of a first supporting segment directly joined to a second layer of a second supporting segment.
Figure 6:
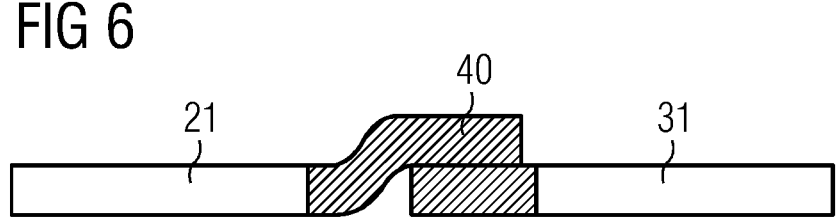
FIG. 6 shows a first layer of a first supporting segment partly overlaying a second layer of a second supporting segment.

FIG. 5 and FIG. 6 show two alternatives how a first layer 21 can be joined to a second layer 31.

In FIG. 5 the first layer 21 of a first supporting segment 20 is directly joined to the second layer 31 of a second supporting segment 30. The direct joint takes place in a supporting structure transition section 40. Exemplarily, the two layers are joined with an adhesive (or setting) material such as an epoxy resin.

In FIG. 6 the first layer 21 partly overlays with the second layer 31 in a supporting structure transition section 40.

Figure 7:
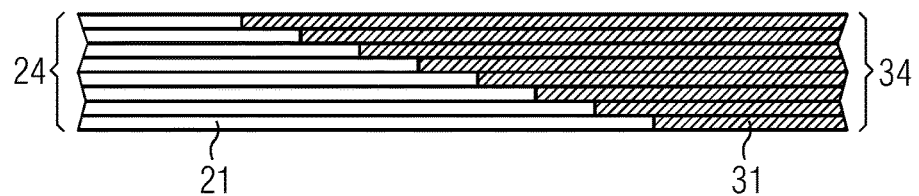
FIG. 7 shows a first embodiment of a first supporting segment joined with a second supporting segment.
Figure 8:
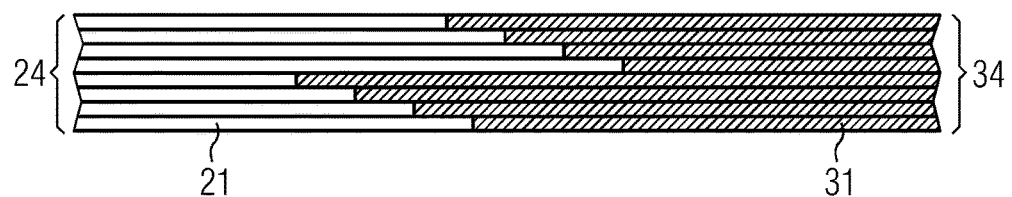
FIG. 8 shows a second embodiment of a first supporting segment joined with a second supporting segment.
Figure 9:
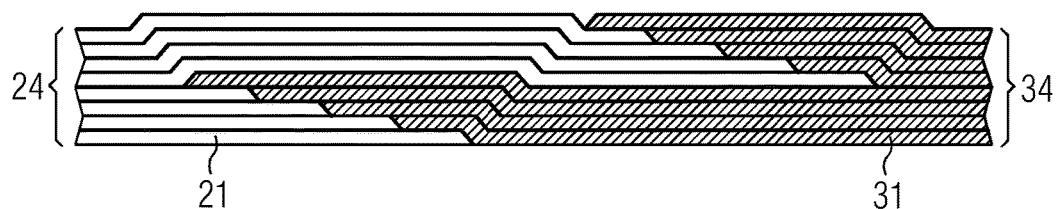
FIG. 9 shows a third embodiment of a first supporting segment joined with a second supporting segment.

Finally, FIG. 7 to FIG. 9 show three embodiments of a first supporting segment 20 joined with a second supporting segment 30. In each of the embodiments the first supporting segment 20 comprises a first layer 21 and a stack of additional layers 24. The stack of additional layers 24 comprises seven individual layers. The seven individual layers are stacked one upon each other. Additionally, the first layer 21 and the stack of additional layers 24 are joined to each other. Analogously, the second supporting segment 30 comprises a second layer 31 and a further stack of further additional layers 34. The further stack of further additional layers 34 comprises seven further individual layers, which are stacked one upon the other. The further stack of further additional layers 34 is joined with the second layer 31.

In a first embodiment, shown in FIG. 7, the layers of the first supporting segment 20 step down evenly. Correspondingly, the layers of the second supporting segment 30 step up evenly, at the same rate. The layers of the first supporting segment 20 are joined with the layers of the second supporting segment 30 such that corresponding layers mate with each other. However, a risk of cracking the joint is relatively high.

In a second embodiment, shown in FIG. 8, the layers of the two supporting segments, namely the first supporting segment 20 and the second supporting segment 30, are grouped into two groups of four layers each. Each group in one supporting segment has a corresponding group in the other supporting segment with which it makes a joint such as in the first embodiment. However, the two groups are displaced or shifted relatively to each other. As a consequence, in the second embodiment the risk of cracking the joint is reduced compared to the first embodiment.

In FIG. 9, a third embodiment is illustrated. The third embodiment is similar to the second embodiment, however each layer overlays with the corresponding layer in the other supporting segment. As a consequence, the risk of cracking the joint is further reduced compared to the first and second embodiment. Additionally, excess material in the supporting structure transition section 40 is kept at a low level.

Figure 10:
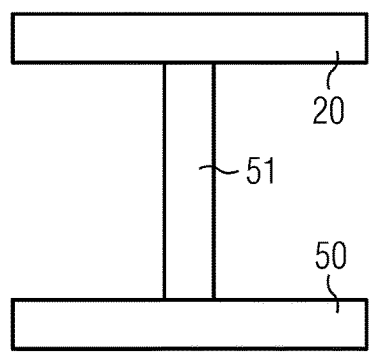
FIG. 10 shows a first supporting segment and a supplementary first supporting segment, joined to each other by means of a first connection component.

Finally, in FIG. 10, a supporting structure comprising a first supporting segment 20 and a supplementary first supporting segment 50, directly joined to each other by means of a first connection component 51, is illustrated. The supporting structure comprises a shape of an "H". Alternatively, a "C"-shape or a box-shape is beneficial, too.

The invention claimed is:

1. A rotor blade comprising:
a rotor blade base section, a rotor blade tip section, and a rearward swept shape; and
a supporting structure which comprises a first supporting segment for supporting the rotor blade base section, a second supporting segment for supporting the rotor blade tip section, and a supporting structure transition section where the first supporting segment and the second supporting segment each terminate and form a joint, wherein the first supporting segment is straight up to the supporting structure transition section, the second supporting segment is straight up to the supporting structure transition section, and the first supporting segment and the second supporting segment form an angle with each other of less than 180 degrees;
wherein the first supporting segment is joined directly to the second supporting segment in the supporting structure transition section, wherein the supporting structure transition section is configured to form the angle to be less than 180 degrees; and
wherein the first supporting segment and/or the second supporting segment comprises a fibre material, and
wherein the supporting segments cooperate to form the rearward swept shape.

2. The rotor blade according to claim 1,
wherein the first supporting segment comprises a first layer of fibre material and the second supporting segment comprises a second layer of fibre material.

3. The rotor blade according to claim 2,
wherein the first layer and/or the second layer comprises a planar shape.

4. The rotor blade according to claim 2, wherein
the first layer comprises at least a first layer longitudinal surface section and at least a first layer transversal surface section, wherein the first layer longitudinal surface section is greater than the first layer transversal surface section;
the second layer comprises at least a second layer longitudinal surface section and at least a second layer transversal surface section, wherein the second layer longitudinal surface section is greater than the second layer transversal surface section; and
the first layer longitudinal surface section is directly joined to the second layer longitudinal surface section in the supporting structure transition section.

5. The rotor blade according to claim 2,
wherein the first layer and the second layer at least partly overlay in the supporting structure transition section.

6. The rotor blade according to claim 2, wherein
the first supporting segment comprises a stack of additional layers for additionally supporting the first supporting segment,
the second supporting segment comprises a further stack of further additional layers for additionally supporting the second supporting segment,
the first layer and the stack of additional layers at least partly overlay,
the second layer and the further stack of further additional layers at least partly overlay, and
the stack of additional layers is joined to the further stack of further additional layers in the supporting structure transition section.

7. The rotor blade according to claim 2,
wherein the first layer of fibre material and/or the second layer of fibre material comprises a shape of a cuboid.

8. The rotor blade according to claim 1,
wherein the fibre material comprises a fabric with fibres.

9. The rotor blade according to claim 1,
wherein the fibre material comprises a composite material.

10. The rotor blade according to claim 1,
wherein the angle is smaller than 175 degrees.

11. The rotor blade according to claim 1, wherein
the first supporting segment comprises a supplementary first supporting segment for additionally supporting the rotor blade,
the second supporting segment comprises a supplementary second supporting segment for additionally supporting the rotor blade, and
the first supporting segment is joined to the supplementary first supporting segment by a first connection component and/or the second supporting segment is joined to the supplementary second supporting segment by a second connection component.

12. The rotor blade according to claim 1,
wherein the rotor blade is a part of a wind turbine engine.

13. The rotor blade according to claim 1,
wherein the fibre material comprises a fabric with unidirectional fibres.

14. The rotor blade according to claim 1,
wherein the fibre material comprises a sheet with pre-impregnated composite material.

15. The rotor blade according to claim 1,
wherein the angle is smaller than 170 degrees.

16. The rotor blade according to claim 1, wherein a rotor blade longitudinal direction extends from the rotor blade base section to the rotor blade tip section, wherein the supporting segments deviate from the rotor blade longitudinal direction by up to 20 degrees.

17. A method for manufacturing a rotor blade according to claim 2, wherein the method comprises
joining the first supporting segment and the second supporting segment.

18. The method according to claim 17, wherein the method comprises a) arranging the first layer and the second layer in a mould;
b) applying a filling material into the mould and thus obtaining a composite comprised by the supporting structure and the filling material; and
c) curing the composite.

19. The method according to claim 18, wherein the filling material is a liquid filling material.

\* \* \* \* \*